(12) United States Patent
Holman

(10) Patent No.: US 6,691,276 B2
(45) Date of Patent: Feb. 10, 2004

(54) METHOD FOR DETECTING AND CORRECTING FAILURES IN A MEMORY SYSTEM

(75) Inventor: Thomas J. Holman, Portland, OR (US)

(73) Assignee: Intel Corporation, Santa Clara, CA (US)

(*) Notice: Subject to any disclaimer, the term of this patent is extended or adjusted under 35 U.S.C. 154(b) by 387 days.

(21) Appl. No.: 09/892,066

(22) Filed: Jun. 25, 2001

(65) Prior Publication Data

US 2002/0199150 A1 Dec. 26, 2002

(51) Int. Cl.[7] .................. G06F 11/10; H03M 13/27; H03M 13/29

(52) U.S. Cl. .................. 714/767; 714/772; 714/773

(58) Field of Search ................. 714/767, 772, 714/773

(56) References Cited

U.S. PATENT DOCUMENTS

| | | | | | |
|---|---|---|---|---|---|
| 5,003,541 | A | * | 3/1991 | Mester | 714/767 |
| 5,058,115 | A | * | 10/1991 | Blake et al. | 714/767 |
| 5,164,944 | A | * | 11/1992 | Benton et al. | 714/765 |
| 5,172,379 | A | * | 12/1992 | Burrer et al. | 714/767 |
| 5,206,865 | A | * | 4/1993 | Gruender et al. | 714/767 |
| 5,455,939 | A | * | 10/1995 | Rankin et al. | 714/6 |
| 5,463,643 | A | * | 10/1995 | Gaskins et al. | 714/766 |
| 5,917,838 | A | * | 6/1999 | Wardrop | 714/767 |
| 6,223,301 | B1 | * | 4/2001 | Santeler et al. | 714/6 |
| 6,370,668 | B1 | * | 4/2002 | Garrett et al. | 714/763 |
| 6,598,199 | B2 | * | 7/2003 | Tetrick | 714/766 |

* cited by examiner

Primary Examiner—Stephen M Baker
(74) Attorney, Agent, or Firm—Blakely, Sokoloff, Taylor & Zafman LLP

(57) ABSTRACT

According to one embodiment, a method is disclosed. The method includes interleaving a first error correction code with a second error correction code to generate a third error correction code that provides chip-kill capabilities for a memory system.

17 Claims, 4 Drawing Sheets

METHOD FOR DETECTING AND CORRECTING FAILURES IN A MEMORY SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to memory systems; more particularly, the present invention relates to correcting single device failures and detecting two device failures in a memory system.

BACKGROUND

A Direct Rambus Dynamic Random Access Memory (Direct RDRAM) developed by Rambus, Inc., of Mountain View, Calif., is a type of memory that permits data transfer operations at high speeds over a narrow channel, e.g. up to 1.2–1.6 gigabytes per second over an 18-bit wide channel. RDRAM devices are typically housed in Rambus in-line memory modules (RIMMs) that are coupled to one or more Rambus channels. Typically, the channels couple each RDRAM device to a memory controller. The memory controller enables other devices, such as a Central Processing Unit (CPU), to access the RDRAMs.

In order to assure the correctness of the RDRAM devices, error-correcting codes may be stored with the data. The most common error codes used are referred to as single error correction—double error detection (SEC-DED). As the name implies, such codes enable the correction of a single-bit error and the detection of double-bit errors.

For some systems, error coverage beyond that provided by a SEC-DED code may be required. For example, a system may require that the failure of an entire memory device be detected and corrected, and the failure of two memory devices be detected. To correct the failure of a single device, a code word is spread over several devices. For example if the code word is 72×18 bits long (e.g., 72 memory devices, 18 bits each), 18 interleaved SEC-DED codes provide correction of a single device failure and detection of a double device failure. However, this approach is not practical because of the large number of devices that must be accessed in parallel and the large amount of data per access (72 devices×16 bytes per device per access=1152 bytes).

Normally, the number of devices that can be accessed in parallel in a computer system utilizing an RDRAM memory system is relatively small (e.g., 2, 4 or 8). As a result, there are not enough check bits in an RDRAM to enable device failure detection and correction using previously available techniques. Therefore, a new method that enables detecting and correcting device failures in an RDRAM memory system is desired.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method for detecting and correcting failures in a memory system is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
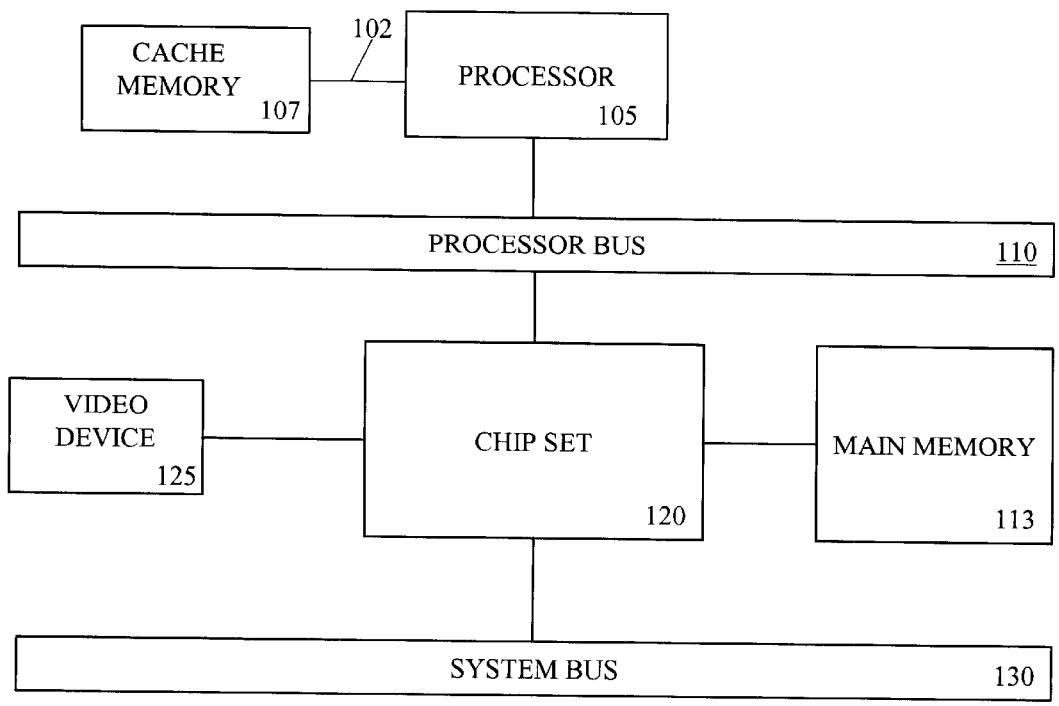
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1). In another embodiment, processor 105 is a processor in the Itanium® family of processors available from Intel Corporation.

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 870 chip set available from Intel Corporation; however, other chip sets can also be used. Chip set 120 may include a memory controller for controlling a main memory 113. Further, chip set 120 may be coupled to a video device 125 that handles video data requests to access main memory 113. In one embodiment, video device 125 includes a video monitor such as a cathode ray tube (CRT) or liquid crystal display (LCD) and necessary support circuitry.

Main memory 113 is coupled to processor bus 110 through chip set 120. Main memory 113 and cache memory 107 store sequences of instructions that are executed by processor 105. In one embodiment, main memory 113 includes a Rambus dynamic random access memory (RDRAM) system; however, main memory 113 may have other configurations. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110. Further, the memory controller may be integrated with the processor and the memory connected directly to the processor in other embodiments.

Figure 2:
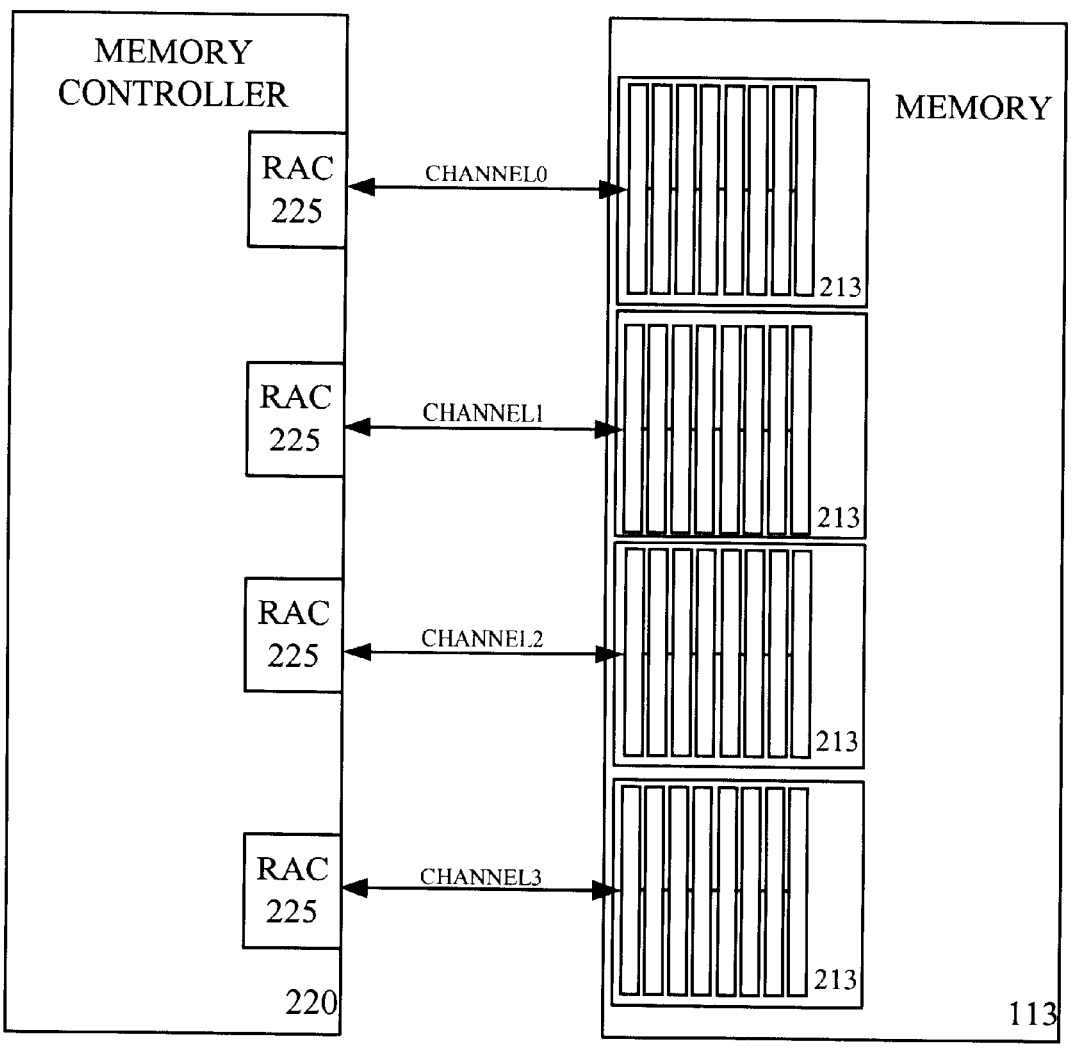
FIG. 2 is a block diagram of one embodiment of a memory controller coupled to a memory device.

FIG. 2 is a block diagram of one embodiment of a memory controller 220 coupled to main memory 113. Memory controller 220 includes four Rambus ASIC Cells (RACs) 225. A RAC 225 is used to interface to a high frequency Rambus channel. The Rambus channels may be driven at 400 MHz, and transfer data on the rising and falling edge of an expansion channel clock. According to one embodiment, each of the RACs 225 within memory controller 220 is coupled to memory 113 via a Rambus channel (channel 0–channel 3). In a further embodiment, memory controller 220 may reside in chipset 120. However, in other embodiments, memory controller 220 may be integrated with a processor or other device.

In a further embodiment, main memory 113 includes a RIMM 213 coupled to each of the four Rambus channels. Each RIMM includes a multitude of DRAM devices. According to one embodiment, each RIMM includes 8 DRAM (or memory) devices (devices a–h). Therefore, each Rambus channel is coupled to 8 memory devices. Nevertheless, one of ordinary skill in the art will appreciate that each Rambus channel may include other quantities of DRAM devices.

Figure 3:
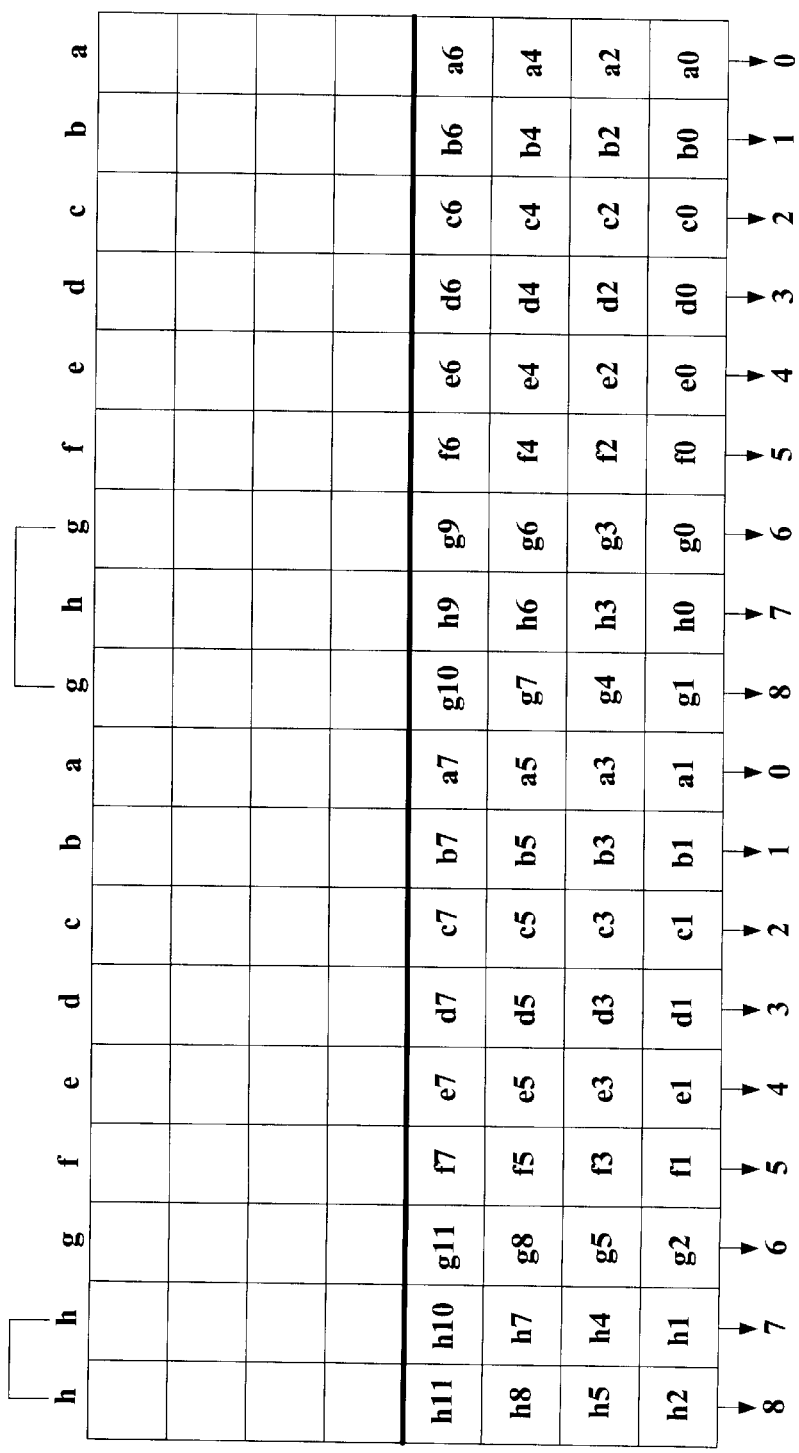
FIG. 3 illustrates one embodiment of a packet format implemented by memory devices within a memory system.

According to another embodiment, the memory devices within memory 113 transmit data to memory controller 220 in the form of packet data upon being accessed. FIG. 3 illustrates one embodiment of a data packet format implemented by memory devices within memory 113. In one embodiment, the packet is 18 bits wide and 8 bits high. Each of the 18 bits in the bit row is implemented as a pin at a memory device. In a further embodiment, each bit row includes 16 bits of data and 2 check bits. In yet another embodiment, a data packet is accessed in 8 clock phases. Therefore, one bit row is accessed in each clock phase. Further, the memory controller 220 clock frequency is typically 400 MHz. At this frequency, each bit row is accessed in 1.25 ns.

According to one embodiment, memory 113 may be accessed according to a normal mode or an interleaved data mode (IDM). When used in the normal mode a single memory device per channel handles an access. That memory device delivers a packet of data from 18 bit pins for 8 clock phases, as described above. In this case, memory controller 220 in FIG. 2 will read or write 4×18×8 bits per access. For each of the 18 bits delivered by a device 16 bits are used for data and 2 bits are used for an ECC code. Thus, in this configuration, an access is across 4 devices and consists of 64 bytes of data and 8 bytes for an ECC code.

In IDM mode, each memory device within a group of 8 devices (e.g., a channel) participates in a given access. This group of 8 devices is called a "logical device". All of the memory devices within the group are accessed as a single logical memory device in order to interleave the data to (and from) the 8 devices into a single data packet. In a further embodiment, the IDM is selectable within a memory controller 220 register at computer system 100 initialization. Thus, in the IDM mode an access is spread across more devices. For example, in the memory system of FIG. 2, an access that is distributed over 4 devices in normal mode is spread across 32 devices in IDM mode.

In the IDM mode, six memory devices within a logical device (e.g., a–f) transmit data on two pins while two memory devices (e.g., g and h) transmit data on three pins. For example, referring to FIG. 3, memory devices a, b c, d, e and f transmit on pins 0, 1, 2, 3, 4 and 5 respectively. Meanwhile, memory device g transmits on two number 6 pins and one number 8 pin, and memory device h transmits on two number 7 pins and one number 8 pin. Taking the first 4 clock phases of the packet in FIG. 3, the six devices a–f deliver 8 bits each while device g and h deliver 12 bits of data. As a result, the output of a logical device is asymmetric with respect to the amount of data per physical device.

In certain applications computer system 100 is capable of continuing operation in the presence of a memory device failure. Thus, data must be scattered across a large enough number of memory devices within memory 113 so that the failure of one device may be tolerated. The term used to describe the capability of memory 113 to tolerate device failures is called "chip-kill". Error detecting and correcting codes implemented for chip-kill capability determine the types of failures that may be tolerated. According to one embodiment, any pattern of errors within a single memory 113 device may be corrected, while any pattern of errors across two devices may be detected. The code used to provide chip-kill capabilities is provided by memory controller 220 and is described in further detail below for RDRAM based memory.

In memory systems such as that illustrated in FIG. 2, a code word (data plus check bits) is spread over 4 devices when the devices are in normal mode. In this case, existing ECC codes are not capable of correcting a single device failure. The code word is spread over too few devices to achieve this level of coverage. Using IDM mode, a code word is spread over 4 logical devices (e.g., one logical device per channel) and is thus distributed over 32 physical devices. Without IDM the minimum access from 32 memory devices is 512 bytes (e.g., 32 devices×18 row bits×8 column bits). Such an access size is too large to be practical because it is much larger than a cache line. However, with IDM the minimum access is 576 bits (64 bytes of data). This access size is more compatible with cache line sizes.

However, even in IDM mode, existing ECC codes are not capable of detecting and correcting single device failures and detecting double device failures with sufficient coverage. This is due in part because of the asymmetry in the distribution of bits across physical devices and in part because of the number of available check bits. According to one embodiment, a coding method that achieves the desired level of error detection and correction coverage for 4 logical devices (32 RDRAM devices in IDM mode) is described.

In one embodiment, data bits received from the logical memory devices of IDM mode are used to generate an error correction scheme. The error code of the correction scheme is generated based upon the pattern of data bits and check bits transmitted in the data packets. In a further embodiment, the data bits in the error code are derived by sampling the first half of a packet from the devices on each channel. As a result, the minimum access for sampling half of the packets is 288 bits (e.g., 32 devices×18 row bits×4 column bits). In such an embodiment, the error code is capable of correcting 8 or 12 bits provided by a single device (e.g., the 8 bits being delivered by devices a–f of the logical device and the 12 bits being delivered by devices h or g of the logical device). The code is also capable of detecting double device errors.

Figure 4:
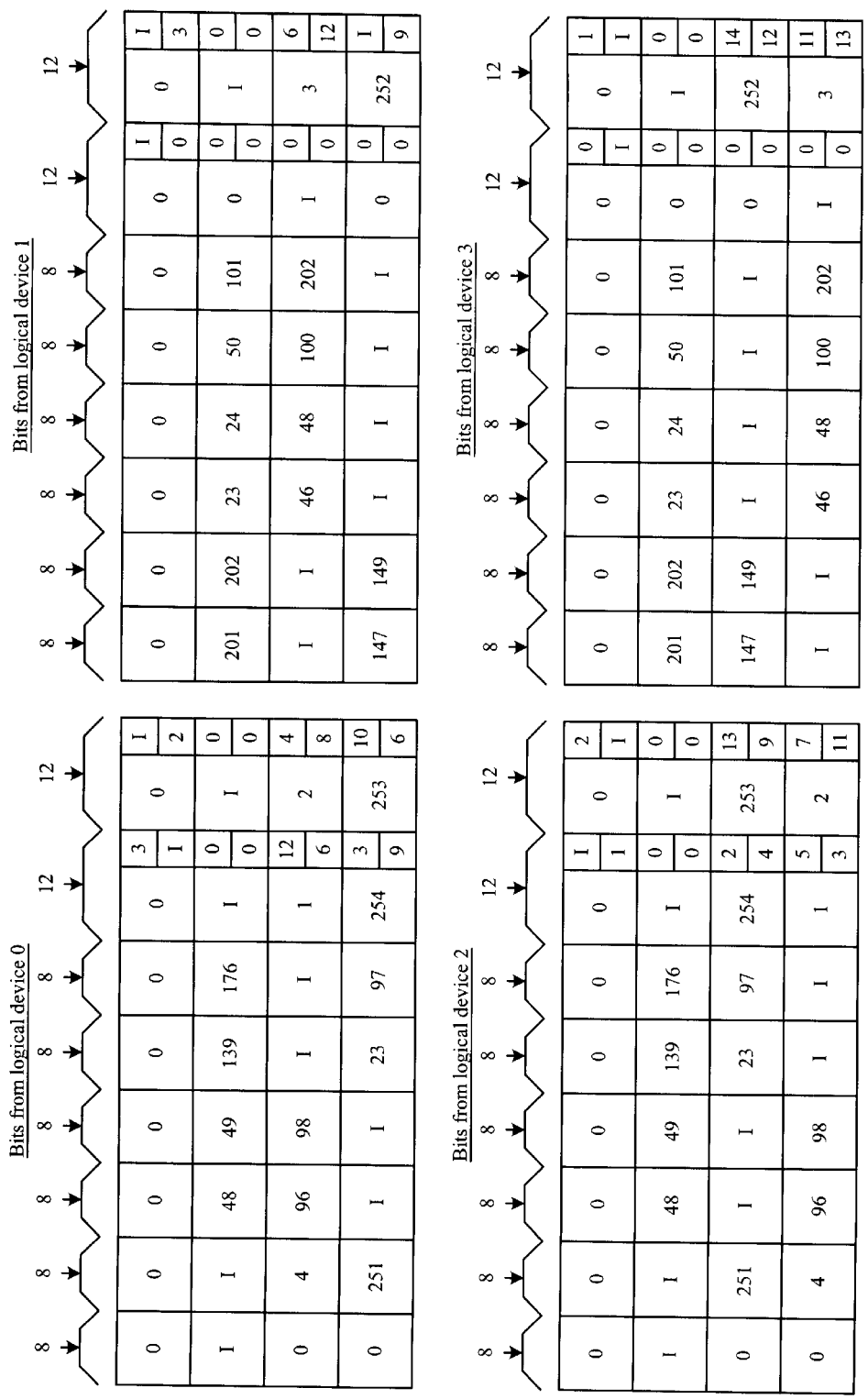
FIG. 4 illustrates one embodiment of interleaved ECC code matrices.

According to one embodiment, the ECC code is generated by interleaving two separate codes. In one embodiment, the first code is based on symbols from GF(8) with $P(x)=x^8+x^4+x^3+x^2+1$ and the second based on symbols from GF(4) with $P(x)=x^4+x+1$. These codes are interleaved as shown in FIG. 4. FIG. 4 illustrates one embodiment of a representation of the two codes as H-matrices. The large squares in FIG. 4 represent GF(8) symbols, which form a first H-matrix (H-matrix 1). The small squares represent GF(4) symbols, which form a second H-matrix (H-matrix 2). When translated to a GF(2) code, the symbols of H-matrix 1 are represented as 8×8 binary matrices, while the symbols of H-matrix 2 are represented as 4×4 binary matrices.

As illustrated in FIG. 4, H-matrix 1 and H-matrix 2 are interleaved to form a new H-matrix for the final code. This new H-matrix spans the four logical devices accessed and computes a syndrome needed to detect and correct the failure of a single physical device, and to detect the failure of two physical devices. As described above, in the IDM mode, a logical device includes 8 physical devices. The disclosed method provides the desired error coverage over the asymmetric device sizes occurring with RDRAM devices in IDM mode. Specifically, of the 8 devices in a logical device, 6 devices deliver 8 bits each in 4 clock phases and 2 devices deliver 12 bits each in 4 clock phases. This results in a total of 24 devices delivering 8 bits each and 8 devices delivering 12 bits each when taken across 4 channels. Overall the disclosed code covers 288 bits, with 256 as data bits and 32 as check bits.

The data bits correspond to the bit positions transmitted on the pins of the respective memory device. Referring back to FIG. 3 for example, the first column of H-matrix 1 covers data bits a0–a7, the second column covers data bits b0–b7, etc. As described above, matrices g and h are 12 bits wide. Accordingly, the seventh column is a combination of columns from H-matrix 1 and H-matrix 2 that covers data bits g0–g11. Data bits h0–h11 are covered in a similar manner.

The exact selection and arrangement of symbols in the two interleaved codes are chosen to meet several important criteria. First, they are chosen to maximize the coverage of errors across two physical devices. Second, they are chosen such that the number of bits in error across two devices is large and is distributed across the devices. This second criteria increases the probability of the detection of a two-device failure. Third, the symbols are chosen to minimize the circuit needed to implement this code both in terms of gate count and critical delays.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Thus, a method for detecting and correcting failures in a memory system has been described.

What is claimed is:

1. A method comprising interleaving a first error correction code with a second error correction code to generate a third error correction code that provides chip-kill capabilities for a memory system.

2. The method of claim 1 wherein the first error correction code is based upon symbols from GF(8) and the second error correction code is based upon symbols from GF(4).

3. The method of claim 1 further comprising:
the memory system entering into an interleaved data mode; and
accessing a first logical memory device in order to interleave data from the first logical memory device into a first packet.

4. The method of claim 3 further comprising sampling the first half of the first and second packets to derive data bits of the third error correction code.

5. The method of claim 3 further comprising accessing a second logical memory device in order to interleave data from the second logical memory device into a second packet.

6. The method of claim 5 wherein the first logical memory device includes a first plurality of physical memory devices and the second logical memory device includes a second plurality of physical memory devices.

7. A computer system comprising:
a memory system;
a first channel coupled to the memory system; and
a memory controller coupled to the first channel, wherein the memory controller interleaves a first error correction code with a second error correction code to generate a third error correction code that provides chip-kill capabilities for the memory system whenever the memory controller is accessing the memory system in an interleaved data mode (IDM).

8. The computer system of claim 7 wherein the memory system is a Rambus Dynamic Random Access Memory.

9. The computer system of claim 7 wherein the memory controller includes a register that when selected determines whether the memory controller operates in the IDM mode or a normal mode.

10. The computer system of claim 7 wherein the memory system comprises a first plurality of memory devices coupled to a first channel, wherein the memory controller accesses the first plurality of memory devices in order to interleave data from the first plurality of memory devices into a first packet.

11. The computer system of claim 10 further comprising a second channel coupled to the memory system and the memory controller.

12. The computer system of claim 11 wherein the memory system comprises a second plurality of memory devices coupled to the second channel, wherein the memory controller accesses the second plurality of memory devices in order to interleave data from the second plurality of memory devices into a second packet.

13. The computer system of claim 12 wherein the memory controller samples the first half of the first and second packets to derive data bits of the third error correction code.

14. The computer system of claim 12 wherein the first and second plurality of memory devices each comprise eight devices, wherein six of the devices each transmit eight bits of data and two of the devices each transmit 12 bits of data the memory controller while operating in the IDM.

15. A memory controller comprising a first Rambus Asic Cell (RAC) coupled to a memory system, wherein the memory controller interleaves a first error correction code with a second error correction code to generate a third error correction code that provides chip-kill capabilities for the memory system whenever the memory controller is accessing the memory system in an interleaved data mode (IDM).

16. The memory controller of claim 15 further comprising a register that enables the memory controller to operate in either a normal mode or the IDM.

17. The memory controller of claim 15 wherein the first error correction code is based upon symbols from GF(8) and the second error correction code is based upon symbols from GF(4).

\* \* \* \* \*